(12) United States Patent
Masuda et al.

(10) Patent No.: US 6,386,631 B1
(45) Date of Patent: May 14, 2002

(54) VEHICLE SEAT ASSEMBLY

(75) Inventors: Kou Masuda; Hiroyoshi Yamaguchi; Tomoharu Ohi; Minoru Takakura, all of Yokohama (JP)

(73) Assignee: NHK Spring Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/334,116

(22) Filed: Jun. 15, 1999

(30) Foreign Application Priority Data

Jun. 16, 1998 (JP) .......................................... 10-168431

(51) Int. Cl.⁷ ................................................. B60N 2/42
(52) U.S. Cl. ................................. 297/216.1; 297/284.11
(58) Field of Search ........................ 297/216.1, 216.18, 297/284.11, 476, 478

(56) References Cited

U.S. PATENT DOCUMENTS

| | | | |
|---|---|---|---|
| 3,591,232 A | 7/1971 | Simon | 297/216.1 |
| 3,858,930 A | 1/1975 | Calandra et al. | 296/68.1 |
| 4,623,192 A | * 11/1986 | Koide et al. | 297/284.11 X |
| 4,652,049 A | * 3/1987 | Maruyama et al. | 297/284.11 X |
| 4,705,296 A | 11/1987 | Andersson et al. | |
| 5,186,494 A | 2/1993 | Shimose | 280/806 |
| 5,340,185 A | 8/1994 | Vollmer | |
| 5,374,105 A | * 12/1994 | Kracht et al. | 297/216.1 |
| 5,403,037 A | 4/1995 | Föhl | 280/806 |
| 5,405,180 A | 4/1995 | Föhl | 297/478 |

(List continued on next page.)

FOREIGN PATENT DOCUMENTS

| | | |
|---|---|---|
| EP | 0 306 299 A1 | 3/1989 |
| GB | 2330334 A | 4/1999 |
| GB | 2337726 A | 12/1999 |
| GB | 2342076 A | 4/2000 |
| JP | 3585053525 | * 3/1983 ............ 297/216.1 |
| JP | 2-149328 | 12/1990 |
| JP | 3-61440 | 6/1991 |
| JP | 3-227745 | 10/1991 |
| JP | 3-121947 | 12/1991 |
| JP | 4-93222 | 8/1992 |
| JP | 5-229378 | 9/1993 |
| JP | 7-81466 | 3/1995 |
| JP | 10-181529 | 7/1998 |

OTHER PUBLICATIONS

English Language Abstract of Japanese Publication No. 58–53525.
Patent Abstracts of Japan, Publication No. 05229378 http://www.2.ipdl.jpo–miti.go.jp/dbpweb/connector/guest/DB-Pquery/ENGDB/wdispaj.
Patent Abstracts of Japan, Publication No. 07081466 http://www.2.ipdl.jpo–miti.go.jp/dbpweb/connector/guest/DB-Pquery/ENGDB/wdispaj.
Patent Abstracts of Japan, Publication No. 10181527 http://www.2.ipdl.jpo–miti.go.jp/dbpweb/connector/guest/DB-Pquery/ENGDB/wdispaj.

*Primary Examiner*—Anthony D. Barfield
(74) *Attorney, Agent, or Firm*—Skjerven Morrill MacPherson LLP; Alan H. MacPherson; David C. Hsia

(57) ABSTRACT

Provided is a vehicle seat assembly which can prevent a submarine phenomenon in a reliable manner, and which is simple in structure so as to allow a high level of flexibility in layout. A slip preventing member for preventing the vehicle occupant from slipping forward under the seat belt in case of an impact is supported by a fixed part of a seat so as to be pivotable between a retracted position and a raised position, and an actuator is interposed between a fixed part of said seat and a part of said slip preventing member. To retain the slip preventing member at its raised position even after the power of the power unit is all used up, the assembly further includes a lock mechanism for retaining said slip preventing member at said raised position.

40 Claims, 6 Drawing Sheets

U.S. PATENT DOCUMENTS

| | | |
|---|---|---|
| 5,449,214 A | 9/1995 | Totani ....................... 296/68.1 |
| 5,451,094 A | 9/1995 | Templin et al. .......... 297/216.7 |
| 5,490,706 A | 2/1996 | Totani ....................... 296/68.1 |
| 5,556,160 A | 9/1996 | Mikami ................... 297/216.1 |
| 5,695,242 A * | 12/1997 | Brantman et al. ........ 297/216.1 |
| 5,908,219 A * | 6/1999 | Bohmler .............. 297/216.1 X |
| 5,984,357 A * | 11/1999 | Yasuda et al. .......... 297/480 X |
| 6,113,185 A | 9/2000 | Yamaguchi et al. ..... 297/216.1 |

\* cited by examiner

VEHICLE SEAT ASSEMBLY

TECHNICAL FIELD

The present invention relates to a vehicle seat assembly, and in particular to a vehicle seat assembly which is adapted to prevent a vehicle occupant from slipping forward under a seat belt in case of an impact such as a vehicle crash.

BACKGROUND OF THE INVENTION

In a phenomenon conventionally known as the submarine phenomenon, a vehicle occupant slips forward under a seat belt in case of an impact such as a vehicle crash, thereby causing the hip belt to dislodge from the hip bone of the vehicle occupant. This phenomenon tends to occur when the vehicle occupant sits on the front edge of the seat or when the seat back is tilted rearward, and could diminish the effectiveness of the seat belt in restraining the vehicle occupant because the seat belt is dislodged from the proper part of the vehicle occupant which is suited for restraining the vehicle occupant.

In view of such a problem, it is conceivable to provide a projection in a front part of the seat frame, and install a panel in a front part of the seat to raise the front end thereof However, such a projection or a panel is too low to be effective and too high to provide desired sitting comfort.

There have been various proposals. For instance, U.S. Pat. No. 5,340,185 discloses a seat assembly using a wire and pulley arrangement for converting a forward movement of the seat in case of a vehicle crash into a lifting movement of the front edge of the seat. This arrangement uses the inertia force as a power source for actuating the front edge of the seat, and is advantageous in not requiring any other power source. However, the arrangement is highly complex, and there would be considerable difficulty in achieving a successful design. Japanese utility model laid open publication No. 3-61440 discloses a similar seat assembly relying on a propellant as a power source for selectively raising the front edge of the vehicle seat. According to this arrangement, although it is necessary to restrain the vehicle occupant for a prolonged period of time depending on the situation, the seat front end will drop again after the thrust of the propellant actuator is used up, and this prevents this prior art arrangement from being truly effective in preventing a submarine phenomenon.

An automobile is often equipped with an emergency locking retractor (ELR) which locks up a winding shaft for the seat belt in case of a sudden stop or a vehicle crash. An ELR device is capable of locking up the winding shaft in a very short time upon detecting a deceleration level greater than a prescribed value so as to prevent any further pay-out of the seat belt. However, simply locking up the winding shaft would not prevent a pay-out of a length of the seat belt corresponding to the tightening of the part of the seat belt wound on the winding shaft. According to a pretensioner device proposed in the U.S. Pat. No. 4,705,296, the buckle which is attached to an end of the seat belt is rapidly moved in the direction to tension the seat belt to enhance the restraining capability of the seat belt. Also, to prevent the buckle from moving backward immediately thereafter, the pretensioner device is provided with a reversing preventing device such as a ratchet and a one-way clutch, separately from that of the ELR device.

The inventors of this application have realized that such a pretensioner device is typically provided with a power unit for pulling the buckle powered by high pressure gas produced from a chemical reaction, for instance, as was the case with the invention disclosed in Japanese patent laid open publication No. 10-181529 by the same applicant.

BRIEF SUMMARY OF THE INVENTION

In view of such problems of the prior art, a primary object of the present invention is to provide a vehicle seat assembly which provides a sitting comfort under normal condition, but can prevent a submarine phenomenon in a reliable manner.

A second object of the present invention is to provide a vehicle seat assembly which is simple in structure so as to allow a high level of flexibility in layout.

A third object of the present invention is to provide a vehicle seat assembly which is economical to manufacture.

A fourth object of the present invention is to provide a vehicle seat assembly incorporated with both a pretensioner device and a submarine preventing device which requires a relatively small number of component parts and is suited for compact design.

According to the present invention, these and other objects can be: (1) a slip preventing member supported by a fixed part of a seat so as to be pivotable between a retracted position and a raised position; (2) an actuator interposed between a fixed part of the seat and a part of the slip preventing member, and adapted to move the slip preventing member toward the raised position; and (3) a lock mechanism for retaining the slip preventing member at the raised position then one embodiment, the slip preventing member includes a lever member supported by a fixed part of the seat so as to be pivotable around a laterally extending pivot shaft, and a rod member extending along the front edge of the seat and attached to a free end of the lever member.

Thus, the present invention provides both a favorable sitting comfort under normal condition and a reliable operation in case of a high impact situation. The simple arrangement contributes to the economy, compactness and reliability of the arrangement. According to a particularly preferred embodiment of the present invention, the slip preventing member comprises a pair of lever members supported on either side of the seat by a fixed part of the seat so as to be pivotable around a laterally extending pivot shaft, and a rod member extending along a front edge of the seat and attached across free ends of the lever members. In particular, at least one of the lever members preferably consists of a bell crank having a first end attached to the rod member, and a second end adapted to be actuated by the actuator which typically consists of a piston/cylinder arrangement including a propellant.

The lock mechanism may be selected from a number of possible arrangements such as (1) a one-way lock mechanism provided around the pivot shaft, and (2) a one-way lock mechanism incorporated between a piston rod and the cylinder.

The submarine preventing arrangement is preferably combined with a pretensioner for full protection of the vehicle occupant, and they are normally placed adjacent to each other. It is advantageous to use a common actuator. For instance, the pretensioner device may include a bell crank member which is pivotally supported by a fixed part of the seat so as to be pivotable around a pivot shaft extending laterally with respect the seat. The bell crank member has a first end attached to the buckle, and a second end attached to an end of the actuator which is common to the submarine preventing arrangement.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
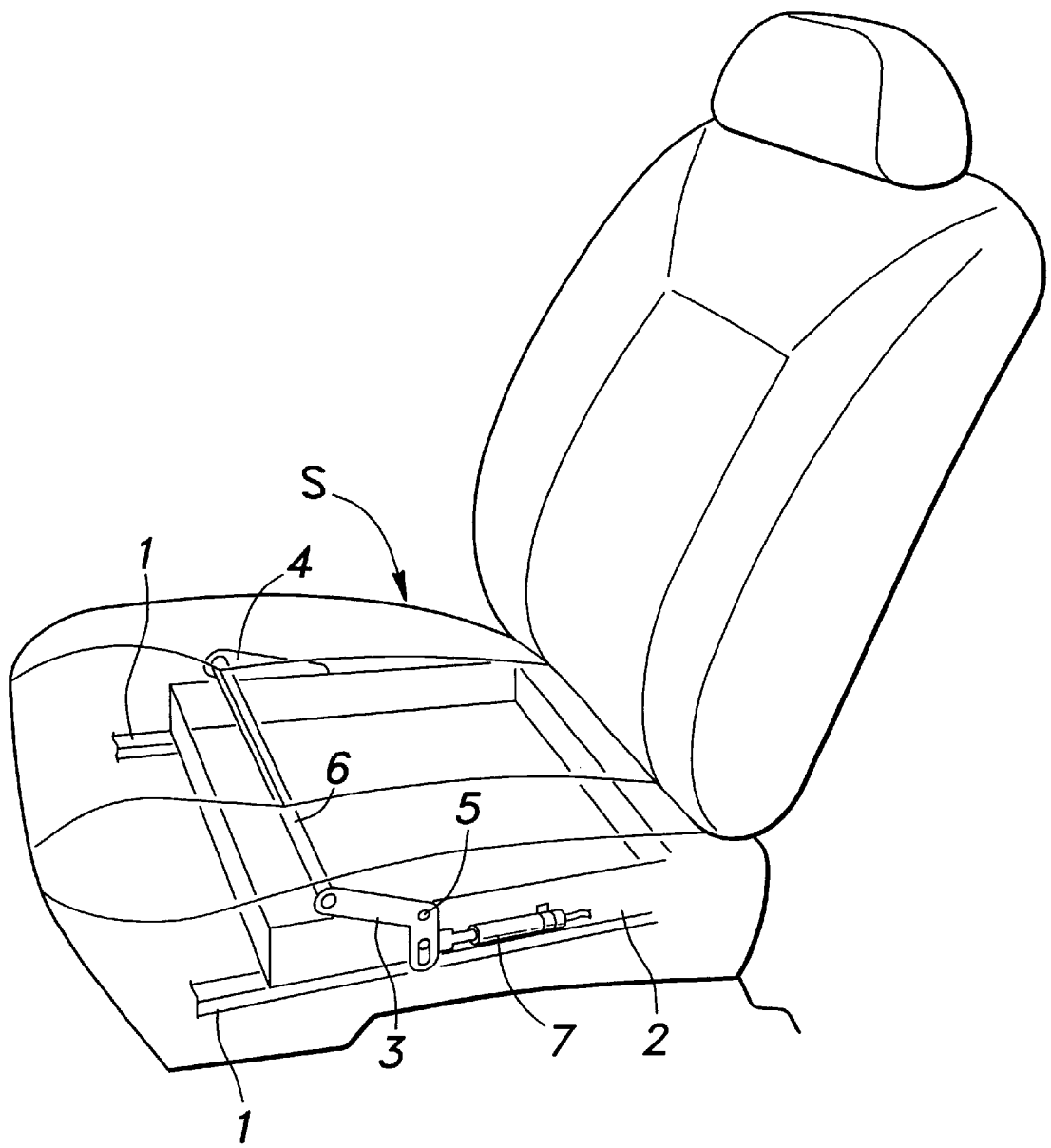
FIG. 1 illustrates, in a perspective view, a vehicle seat assembly the present invention.
Figure 2:
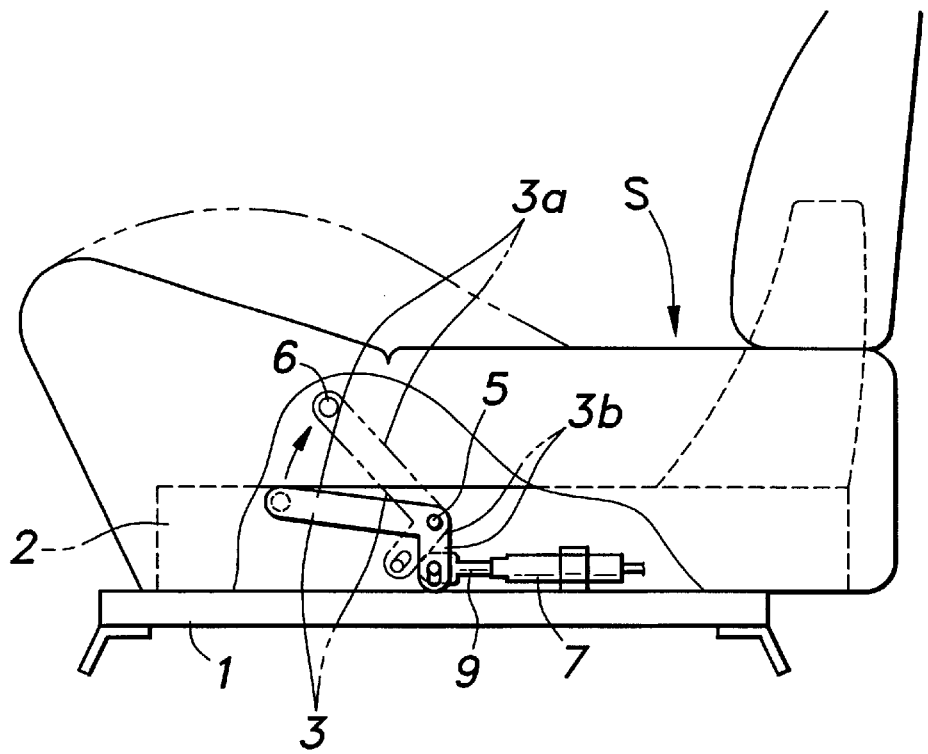
FIG. 2 is a partly broken away side view of the vehicle seat assembly of FIG. 1.

FIG. 1 illustrates a perspective view of a vehicle seat assembly S in accordance with the present invention, FIG. 2 is a partly broken away side view of vehicle seat assembly S of FIG. 1. A seat frame 2 is supported by seat rails 1 fixedly attached to the vehicle body so as to be slidable in the fore-and-aft direction, and can be selectively secured at a desired position by a lock mechanism not shown in the drawings. In the detailed description so far, seat assembly 5 is quite conventional.

In the seat frame 2 are supported a bell crank or an L-shaped link member 3 and an arm 4 which are pivotally supported, at either side end of seat frame 2, by a pair of pivot shafts 5, respectively, which are aligned on a common pivot axis extending in the lateral direction with respect to the vehicle body or perpendicularly through the paper of FIG. 2. L-shaped link member 3 includes a long arm section 3a and a short arm section 3b, and is pivotally supported at the intersection or the bent portion by the pivot shaft 5. Arm 4 can consist solely of a long arm section, and is supported by the seat frame 2 at a base end thereof by pivot shaft 5 which is hidden from view in FIG. 1. Arm 4 can also consist of a bell crank identical to L-shaped link member 3 (not shown) component parts although the short arm section of the bell crank 4 may not serve any other purpose in that case.

The free ends of long arm section 3a of L-shaped link member 3 and of arm 4 are joined by a bar 6 extending laterally along a front edge of the seat, and serving as a main part of the slip preventing member. The free end of short arm section 3b of link member 3 is pivotally connected to a free end 9a (see FIG. 3) of a piston assembly 9 of a power unit 7. The free end of short arm section 3b of the link member 3 is provided with an elongated slot so as to accommodate the arcuate motion of the link member 3 to the linear motion of the piston assembly 9.

Figure 3:
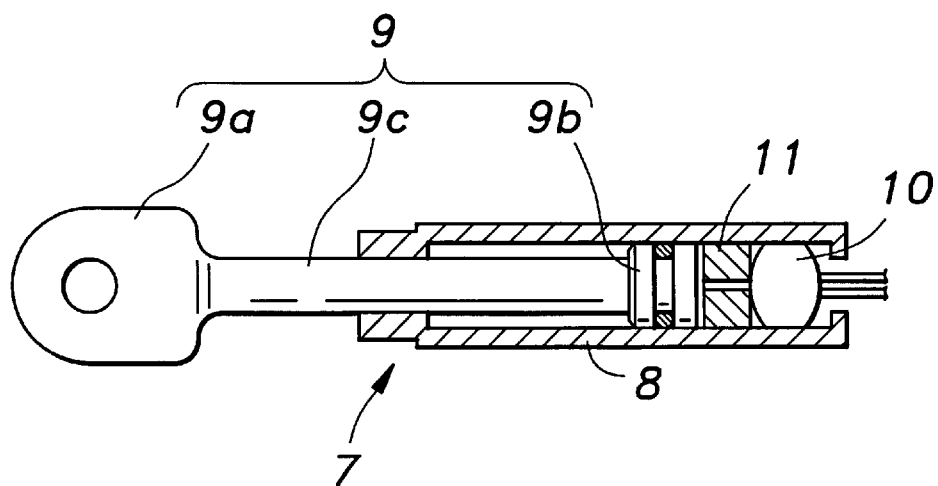
FIG. 3 is a sectional view showing the structure of a power unit of the vehicle seat assembly of FIG. 1.

Referring to FIG. 3, the power unit 7 comprises a cylinder 8 fixedly 5 secured to the seat frame 2, a piston 9b which is slidably received in the cylinder 8, and a gas generator 10 received in the cylinder 8 on the base end of the piston 9b. A collar 11 is interposed between the piston 9b and the gas generator 10. The piston 9b engages the wall surface of the bore of the cylinder 8 via an O-ring.

Therefore, by rapidly increasing the inner pressure of the cylinder 8 with the gas 10 generator 10, the free end 9a of the piston assembly 9 may be projected from the cylinder 8 at high speed. The opening on the working end (left end) of the cylinder 8 is reduced in diameter by swaging so as to engage the outer circumferential surface of the intermediate part of a piston rod 9c of the piston assembly 9.

Figure 4:
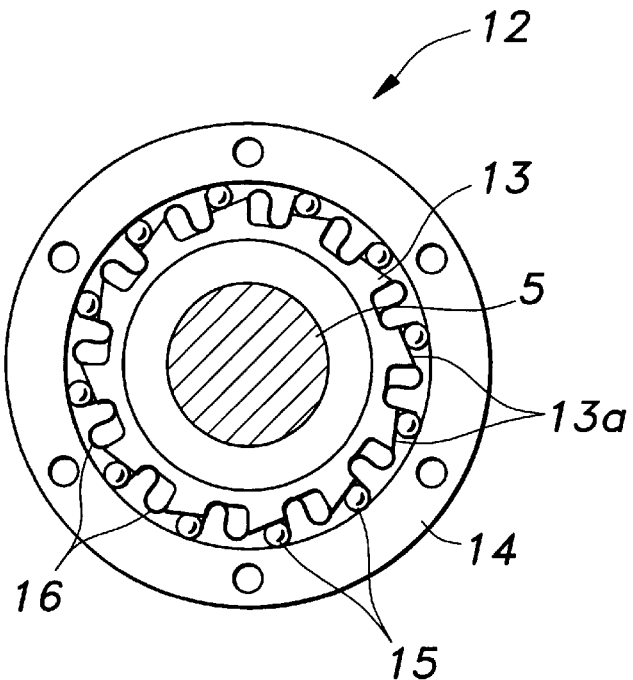
FIG. 4 is a sectional view showing the structure of a ball-type one-way lock mechanism of a vehicle seat assembly in one embodiment of the present invention.

Meanwhile, the support portion 5 is provided with a ball-type one-way lock mechanism 12 as shown in FIG. 4. The ball-type one-way lock mechanism 12 comprises a cam member 13 which is integral with the link member 3, a ring member 14 which is integral with the seat frame 2 and concentrically surrounds the cam member 13 so as to be rotatable relative to the cam member 13, and a large number of balls 15 which are each individually received in a chamber defined between the cam member 13 and the ring member 14. The outer peripheral edge of the cam member 13 is wavy in shape, defining inclined surfaces 13a at a regular interval so that each of the chambers defined between the cam member 13 and the ring member 14 gets narrower in a circumferential direction by virtue of the inclined surfaces 13a. Each of the balls 12 can wedge in the gap defined between the wall surfaces of the cam member 13 and the ring member 14 in the narrow part of the corresponding chamber so as to fixedly secure the two parts relatively to each other. Each of the balls 15 is urged toward the narrower part of the chamber by a sheet spring 16 formed by bending a piece of a common plate member. Therefore, as the EA member 3 turns in the clockwise direction in FIG. 2, or as the bar 6 on the free end of the long arm section 3a moves upward, the balls 15 are allowed to roll freely toward the broader part of the corresponding chambers. However, as the link member 3 turns in the counter clockwise direction in FIG. 2, or as the bar 6 on the free end of the long arm section 3a moves downward, the balls 15 are forced to roll toward the narrower part of the corresponding chambers so that the bar 6 is prevented from moving, and is retained at that position.

Now the mode of operation of this embodiment is described in the following. First of all, when an impact such as that produced by a vehicle crash is detected by a sensor or the like not shown in the drawing, gas is produced from the gas generator 10, and rapidly increases the inner pressure in the cylinder 8, causing the free end 9a of the piston assembly 9 to project from the cylinder 8 at high speed. Then, because the link member 3 attached to the free end 9a of the piston assembly 9 turns in clockwise direction, and the free end of the short arm section 3b is connected to the power generator 7, the bar 6 is raised via the long arm section 3a as indicated by the imaginary lines in FIG. 2. This in turn causes a front part of the seat to rise, and thereby prevents the submarine phenomenon from occurring to the vehicle occupant. Even after the gas ceases to be produced from the gas generator 10 thereby stopping the generation of power from the power unit 7 or the drive force from the power unit 7, the ball-type one-way lock mechanism 12 prevents the raised bar 6 from moving down, and thereby maintains the capability to prevent the submarine phenomenon.

FIGS. 5 to 8 show alternate embodiments of the lock mechanism for retaining the bar 6 serving as the slip preventing member at its raised position.

Figure 5:
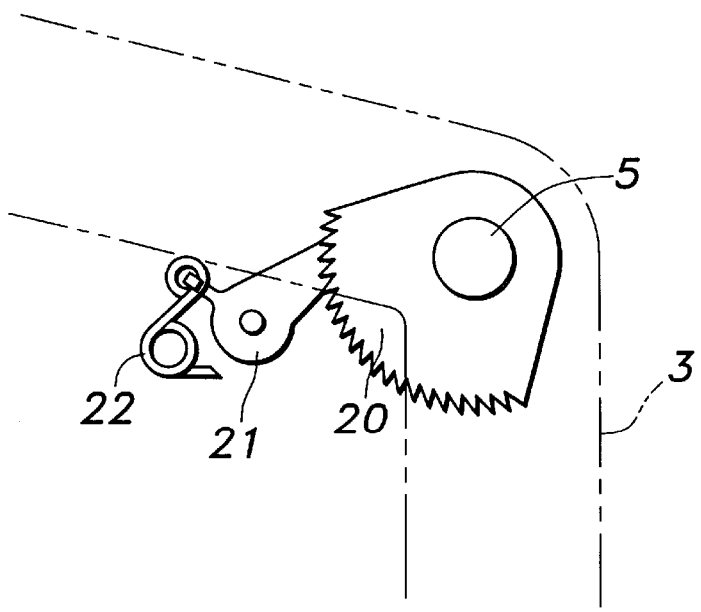
FIG. 5 illustrates a modified embodiment of the lock mechanism for retaining the slip preventing member at its raised position.

In the embodiment illustrated in FIG. 5, a ratchet wheel 20 is fixedly attached to the intersection or the bent part of the L-shaped link member 3, and a pawl 21 pivotally supported on the seat frame 2 is urged by a spring 22 into engagement with the ratchet wheel 20.

Figure 6:
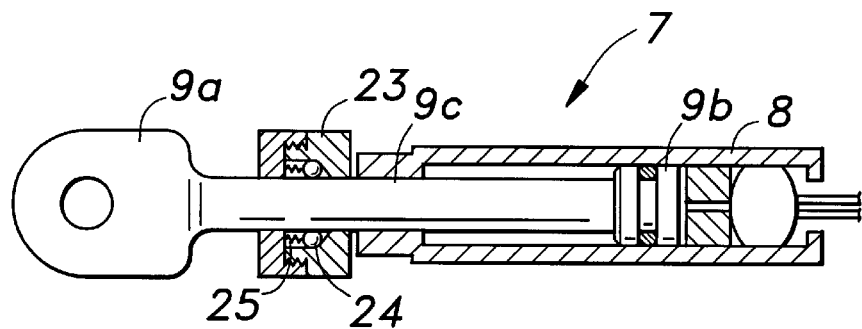
FIG. 6 illustrates another modified embodiment of the lock mechanism for retaining the slip preventing member at its raised position.

In the embodiment illustrated in FIG. 6, the lock mechanism is incorporated in the power unit 7. A casing 23 is fixedly secured to the cylinder 8 or the seat frame 2 so as to surround the outer periphery of the piston rod 9c, and a number of balls 24 and springs 25 for urging the balls 24 in the direction to retract the piston rod 9c are received in a chamber defined between the piston rod 9c and the casing 23. The inner wall of the casing 23 is inclined to make the chamber narrower on the side of the base end of the piston assembly 9 than on the side of the free end of the piston assembly 9. This arrangement operates in a substantially similar manner as the ball-type one-way lock mechanism. In other words, the piston assembly 9 is allowed to move freely in the projecting direction, but prohibited from moving into the cylinder 8 because the balls 24 wedge into a gap defined between the piston rod 9c and the wall surface of the casing 23, and prevent any further movement of the piston assembly 9.

Figure 7:
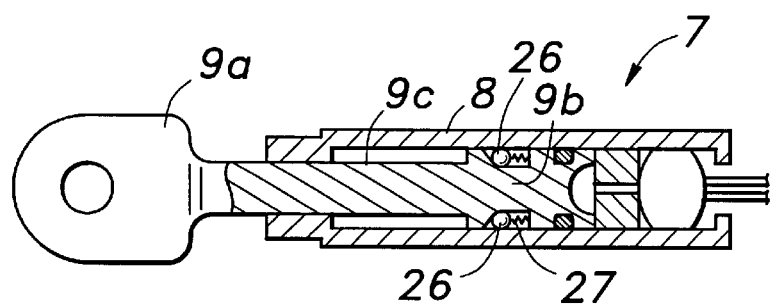
FIG. 7 illustrates yet another modified embodiment of the lock mechanism for retaining the slip preventing member at its raised position.

In the embodiment illustrated in FIG. 7, a chamber is defined inside the cylinder 8 of the power unit 7 between the inner wall surface of the cylinder 8 and the piston 9b, and a number of balls 26 and springs 27 for urging the balls 26 in the direction to retract the piston assembly 9 are received in this chamber. The outer circumferential surface of the piston 9b defines an inclined surface inside the chamber in such a manner that the chamber gets narrower from the base end of the piston assembly to the free end thereof. As it operates in a substantially same manner as that illustrated in FIG. 6, a detailed description of the operation of this embodiment is omitted.

Figure 8:
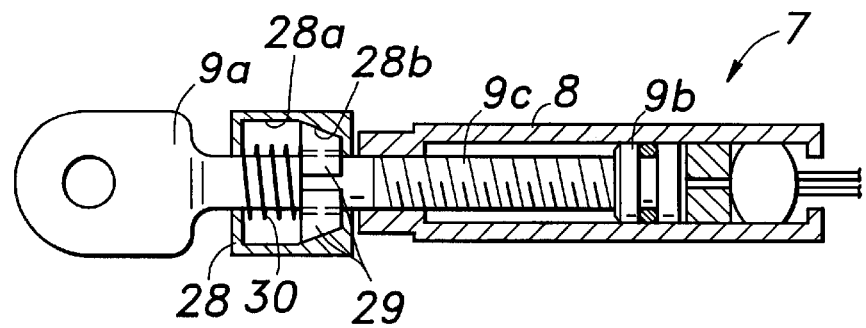
FIG. 8 illustrates yet another modified embodiment of the lock mechanism for retaining the slip preventing member at its raised position.

In the embodiment illustrated in FIG. 8, the lock mechanism is incorporated in the power unit 7. A casing 28 is fixedly secured to the cylinder 8 or the seat frame 2 so as to surround the outer periphery of the piston rod 9b, and a number of engagement pieces 29 and springs 30 for urging the engagement pieces 29 toward the base end of the piston 9b or toward the cylinder 8 are received inside the casing 28. The outer peripheral surface of each of the engagement pieces 29 is gradually diminished in outer diameter from the free end of the piston assembly 9 to the base end thereof. The interior of the casing 28 includes a large diameter section 28a and a tapered section 28b which is progressively reduced in diameter away from the large diameter section 28a. Therefore, the engagement pieces 29 engage the outer circumferential surface of the piston 9 because the engagement pieces 29 are urged by the springs 30 and pressed upon by the tapered section 28b as a result in the state illustrated in FIG. 8. However, as the piston assembly 9 moves in the projecting direction or in the direction to raise the bar 6, the engagement pieces 29 are moved in the projecting direction of the piston assembly 9 against the urging force of the springs 30 until they reach the large diameter section 28a, thereby disengaging themselves from the piston rod 9c, and allowing the piston assembly 9 to move freely. Conversely, when the piston assembly 9 is moved in the retracting direction, the engagement pieces 29 are moved in the direction of the tapered section 28b under the urging force of the springs 30, and engage the outer circumferential surface of the piston rod 9c so as to fixedly secure the piston rod 9c thereto. This arrangement alone can provide a lock mechanism, but annular grooves or projections or a screw thread are formed on the inner circumferential surface of each engagement piece 29. The base end of the piston rod 9c is also provided with corresponding annular grooves or projections or a corresponding screw thread. Therefore, when an attempt is made to move the piston assembly 9 in the retracting direction, the inner circumferential surface of each engagement piece 29 and the outer circumferential surface of the piston rod 9c engage each other, and firmly retain each other.

Figure 9:
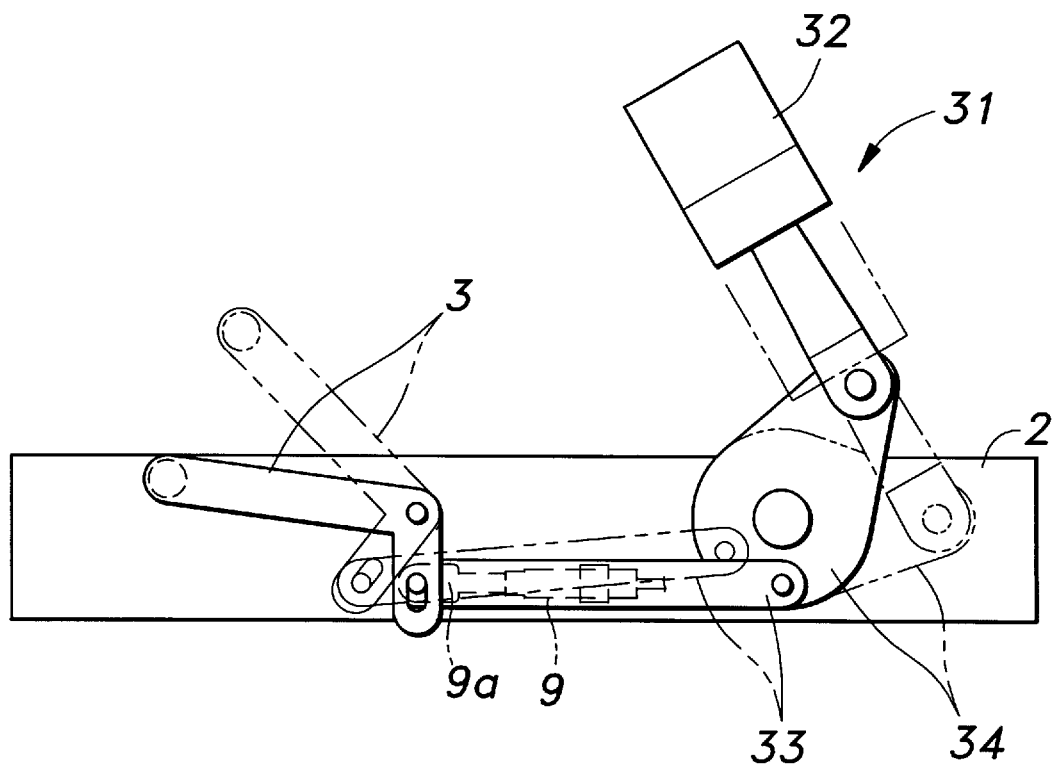
FIG. 9 illustrates a view similar to FIG. 2, a second embodiment of he present invention.

FIG. 9 is a view similar to FIG. 2 showing another embodiment of the present invention. In this drawings, the parts corresponding to those in FIG. 2 are denoted with like numerals without repeating a detailed description of such parts. In this embodiment, the power unit 2 shown in FIG. 2 additionally serves as a power unit for moving a buckle of a seat belt in the tensioning direction in a pretensioner device 31 for automatically tensioning a seat belt in case of a vehicle crash. The ball-type one-way lock mechanism 12 described above or the modified embodiments thereof (FIGS. 5 to 8) additionally serves as a lock mechanism for retaining the buckle 32 of the seat belt at a position for maintaining a tension in the seat belt.

More specifically, the pretensioner device 31 comprises a bell crank or a rotary arm 34 pivotally attached to a side of the seat so as to be rotatable around a laterally extending pivot axis. The rotary arm 34 is provided with a first end which is pivotally attached to a base end of the buckle 32, and a second send which is pivotally attached to a link member 33 which is in turn pivotally attached to the free end 9a of the piston assembly 9 of the power unit 7. Thus, when an impact due to a vehicle crash or the like is detected by a sensor not shown in the drawing, gas is generated from a gas generator 10, and the resulting rapid increase in the inner pressure of the cylinder 8 causes the free end of the piston assembly 9 to project from the cylinder 8 at high speed. As the bar 6 moves or projects upward, the buckle 32 is pulled downward as indicated by the imaginary line at the same time, applying a tension to the seat belt and increasing the restraining force for the vehicle occupant. Even when the drive force of the power unit 7 is all spent, because the ball-type one-way lock mechanism or any one of the modifications thereof (FIGS. 5 to 8) prevents the reversing of the buckle 32 or the slackening of the seat belt.

Figure 10:
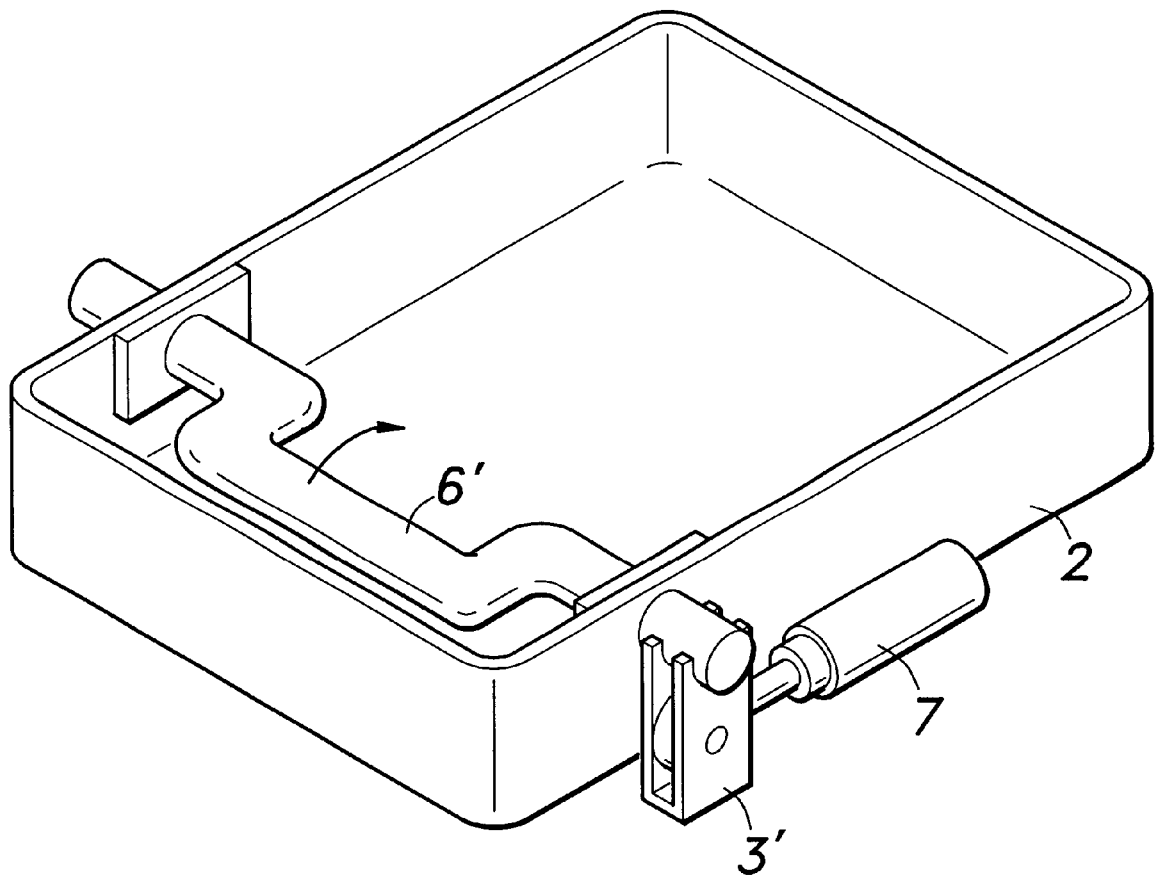
FIG. 10 illustrates a perspective view, an essential part of a third embodiment of the seat assembly according to the present invention.

The link member 3 consisted of an L-shaped member in the above described embodiments, it is also possible to rotatably support a bar 6' having a C-shaped middle section which is provided with a lever 3' at an end thereof as illustrated in FIG. 10, and to drive this lever 3' with the power unit 7 so as to selectively raise the C-shaped part of the bar 6'. In this embodiment also, to accommodate the arcuate motion of the lever 3' to the linear motion of the power unit 7, the output end of the power unit 7 is connected to the lever 3' via a pin and slot arrangement similar to that shown in FIG. 2.

As can be appreciated from the above description, according to the vehicle seat assembly of the present invention, a slip preventing member for preventing the vehicle occupant from slipping forward under the seat belt in case of an impact is either directly or indirectly connected to a power unit which can project a piston received in a cylinder with gas generating means in such a manner that the slip preventing member is projected upward upon detecting an impact to the vehicle, and is retained at its projected state with a lock mechanism. Therefore, in a case of an impact, a submarine phenomenon can be prevented in a reliable manner, and the simplicity in structure allows a high level of flexibility in layout. In particular, when the power unit additionally serves as a power unit for moving a buckle of a seat belt in the tensioning direction in a pretensioner device for automatically tensioning a seat belt in case of a vehicle crash, the number of necessary component parts can be minimized, and the device can be compactly designed.

Although the present invention has been described in terms of preferred embodiments thereof, it is obvious to a person skilled in the art that various alterations and modifications are possible without departing from the scope of the present invention which is set forth in the appended claims.

What is claimed is:

1. A vehicle seat assembly, comprising:
    a slip preventing member supported by a seat so as to be pivotable between a retracted position and a raised position;
    an actuator interposed between said seat and said slip preventing member, and adapted to move said slip preventing member toward said raised position;
    a lock mechanism for retaining said slip preventing member at said raised position;
    wherein said slip preventing member comprises a pair of lever members supported on either side of said seat so as to be pivotable around a pair of laterally extending pivot shafts, and a rod member extending along a front edge of said seat and attached across free ends of said lever members;
    wherein at least one of said lever members consists of a bell crank having a first end attached to said rod member, and a second end adapted to be actuated by said actuator; and
    wherein said actuator comprises a piston/cylinder assembly connected between said second end and said seat, said piston/cylinder assembly comprising a cylinder and a gas generator received in said cylinder.

2. The vehicle seat assembly of claim 1, wherein said lock mechanism comprises a one-way lock mechanism provided around at least one of said pair of pivot shafts.

3. The vehicle seat assembly of claim 1, wherein said piston/cylinder assembly further comprises a piston rod and said lock mechanism comprises a one-way lock mechanism incorporated between said piston rod and said cylinder.

4. The vehicle seat assembly of claim 3, wherein said lock mechanism is provided inside said cylinder.

5. The vehicle seat assembly of claim 3, wherein said lock mechanism is provided outside said cylinder.

6. The vehicle seat assembly of claim 1, further comprising a seat belt pretensioner device which is adapted to selectively move a seat belt buckle in a direction to apply a tension to a seat belt and powered by said actuator.

7. The vehicle seat assembly of claim 1, wherein said pretensioner device comprises a bell crank member which is pivotally supported by a fixed part of said seat so as to be pivotable around a pivot shaft extending laterally with respect to said seat, said bell crank member having a first end attached to said buckle, and a second end attached to an end of said actuator.

8. A vehicle seat assembly, comprising:
    a slip preventing member supported by a seat so as to be pivotable between a retracted position and a raised position;
    an actuator interposed between said seat and said slip preventing member, and adapted to move said slip preventing member toward said raised position, said actuator comprising a piston rod and a cylinder;
    a lock mechanism for retaining said slip preventing member at said raised position; and
    wherein said lock mechanism comprises a one-way lock mechanism incorporated between said piston rod and said cylinder.

9. The vehicle seat assembly of claim 8, wherein said lock mechanism is provided inside said cylinder.

10. The vehicle seat assembly of claim 8, wherein said lock mechanism is provided outside said cylinder.

11. The vehicle seat assembly of claim 8, wherein said slip preventing member comprises a lever member supported by said seat so as to be pivotable around a laterally extending pivot shaft, and a rod member extending along a front edge of said seat and attached to a free end of said lever member.

12. The vehicle seat assembly of claim 8, wherein said slip preventing member comprises a pair of lever members supported on either side of said seat so as to be pivotable around a pair of laterally extending pivot shafts, and a rod member extending along a front edge of said seat and attached across free ends of said leaver members.

13. The vehicle seat assembly of claim 12, Wherein at least one of said lever members consists of a bell crank having a first end attached to said rod member, and a second end adapted to be actuated by said actuator.

14. The vehicle seat assembly of claim 13, wherein said actuator is connected between said second end and said seat, said actuator further comprising a gas generator received in said cylinder.

15. The vehicle seat assembly of claim 1, further comprising a seat belt pretensioner device which is adapted to selectively move a seat belt buckle in a direction to apply a tension to a seat belt and powered by said actuator.

16. The vehicle seat assembly of claim 15, wherein said pretensioner comprises a bell crank member which is pivotally supported by said seat so as to be pivotable around a pivot shaft extending laterally with respect to said seat, said bell crank member having a first end attached to said buckle, and a second end attached to an end of said actuator.

17. A vehicle seat assembly, comprising:
    a slip preventing member supported by a seat so as to be pivotable between a retracted position and a raised position;
    an actuator interposed between said seat and said slip preventing member, and adapted to move said slip preventing member toward said raised position;
    a lock mechanism for retaining said slip preventing member at said raised position; and
    a seat belt pretension device which is adapted to selectively move a seat belt buckle in a direction to apply a tension to a seat belt;
    wherein said slip preventing member comprises a lever member supported by said seat so as to be pivotable around a laterally extending pivot shaft, and a rod member extending along a front edge of said seat and attached to a free end of said lever member.

18. A vehicle seat assembly, comprising:
    a slip preventing member supported by a seat so as to be pivotable between a retracted position and a raised position;
    an actuator interposed between said seat and said slip preventing member, and adapted to move said slip preventing member toward said raised position;
    a lock mechanism for retaining said slip preventing member at said raised position; and
    a seat belt pretension device which is adapted to selectively move a seat belt buckle in a direction to apply a tension to a seat belt;
    wherein said slip preventing member comprises a pair of lever members supported on either side of said seat so as to be pivotable around a pair of laterally extending pivot shafts, and a rod member extending along a front edge of said seat and attached across free ends of said lever members.

19. The vehicle seat assembly of claim 18, wherein at least one of said lever members consists of a bell crank having a first end attached to said rod member, and a second end adapted to be actuated by said actuator.

20. The vehicle seat assembly of claim 19, wherein said actuator comprises a piston/cylinder assembly connected between said second end and said seat, said piston/cylinder assembly comprising a cylinder and a gas generator received in said cylinder.

21. The vehicle seat assembly of claim 17, wherein said lock mechanism comprises a one-way lock mechanism provided around said another pivot shaft.

22. A vehicle seat assembly, comprising:
a slip preventing member supported by a seat so as to be pivotable between a retracted position and a raised position;
an actuator interposed between said seat and said slip preventing member, and adapted to move said slip preventing member toward said raised position;
a lock mechanism for retaining said slip preventing member at said raised position; and
a seat belt pretension device which is adapted to selectively move a seat belt buckle in a direction to apply a tension to a seat belt;
wherein said actuator comprises a piston rod and a cylinder and said lock mechanism comprises a one-way lock mechanism incorporated between said piston rod and said cylinder.

23. The vehicle seat assembly of claim 22, wherein said lock mechanism is provided inside said cylinder.

24. The vehicle seat assembly of claim 22, wherein said lock mechanism is provided outside said cylinder.

25. A vehicle seat assembly, comprising
a slip preventing member supported by a seat so as to be pivotable between a retracted position and a raised position;
an actuator interposed between said seat and said slip preventing member, and adapted to move said slip preventing member toward said raised position,
a lock mechanism for retaining said slip preventing member at said raised position; and
said actuator comprising a piston/cylinder assembly connected between said seat and said slip preventing member, said piston/cylinder assembly comprising a cylinder and a gas generator received in said cylinder.

26. The vehicle seat assembly of claim 25 wherein said slip preventing member comprises a lever member supported by said seat so as to be pivotable around a laterally extending pivot shaft, and a rod member extending along a front edge of said seat and attached to a free end of said lever member.

27. The vehicle seat assembly of claim 25, wherein said slip preventing member comprises a pair of lever members supported on either side of said seat so as to be pivotable around a pair of laterally extending pivot shafts, and a rod member extending along a front edge of said seat and attached across free ends of said lever members.

28. The vehicle seat assembly of claim 29, wherein at least one of said lever members consists of a bell crank having a first end attached to said rod member, and a second end adapted to be actuated by said actuator.

29. The vehicle seat assembly of claim 27, wherein said lock mechanism comprises a one-way lock mechanism provided around at least one of said pair of pivot shafts.

30. The vehicle seat assembly of claim 25, wherein said piston/cylinder assembly further comprises a piston rod and said lock mechanism comprises a one-way lock mechanism incorporated between said piston rod and said cylinder.

31. The vehicle seat assembly of claim 30, wherein said lock mechanism is provided inside said cylinder.

32. The vehicle seat assembly of claim 30, wherein said lock mechanism is provided outside said cylinder.

33. The vehicle seat assembly of claim 32, further comprising a seat belt pretensioner device which is adapted to selectively move a seat belt buckle in a direction to apply a tension to a seat belt and powered by said actuator.

34. The vehicle seat assembly of claim 33, wherein said pretensioner comprises a bell crank member which is pivotally supported by said seat so as to be pivotable around a pivot shaft extending laterally with respect said seat, said bell crank member having a first end attached to said buckle, and a second end attached to an end of said actuator.

35. A vehicle seat assembly, comprising:
a seat frame;
a shaft mounted on said seat frame;
a first lever pivotably mounted on said shaft;
an actuator coupled between an end of said first lever and said seat frame, said actuator comprising:
a cylinder;
a piston located in said cylinder;
a piston rod fixedly attached to said piston; and
a gas generator located in said cylinder opposite of said piston; and
a rod coupled to another end of said first lever, wherein said rod has a C-shaped middle section.

36. A vehicle seat assembly, comprising:
a seat frame;
a shaft mounted on said seat frame;
a first lever pivotably mounted on said shaft;
an actuator coupled between an end of said first lever and said seat frame, said actuator comprising:
a cylinder;
a piston located in said cylinder;
a piston rod fixedly attached to said piston; and
a gas generator located in said cylinder opposite of said piston; and
a locking mechanism interposed between said piston rod and said cylinder, wherein said locking mechanism comprises:
a casing mounted on said cylinder;
a chamber defined between an inner surface of said casing and an outer surface of said piston rod, wherein at least a portion of said inner surface of said casing being inclined relative to said outer surface of said piston rod;
an engagement piece located in said chamber, said engagement piece being interposed between said casing and said piston rod; and
a spring in said casing, said spring being interposed between said casing and said engagement piece.

37. The vehicle seat assembly of claim 36, wherein said engagement piece is a ball.

38. The vehicle seat assembly of claim 36, wherein said engagement piece has an outer surface being parallel to said portion of inclined inner surface of said casing.

39. A vehicle seat assembly, comprising:
a slip preventing member supported by a seat so as to be pivotable between a retracted position and a raised position;
an actuator interposed between said seat and said slip preventing member, and adapted to move said slip preventing member toward said raised position, wherein said actuator comprises:
a cylinder;
a piston located in said cylinder;

a piston rod fixedly attached to said piston;

a gas generator located in said cylinder opposite of said piston; and a locking mechanism interposed between said piston rod and said cylinder, said lock mechanism for retaining said slip preventing member at said raised position; and a seat belt pretension device which is adapted to move a seat belt buckle in a direction away from an occupant seated on said seat.

40. A vehicle seat assembly, comprising:

a slip preventing member supported by a seat so as to be pivotable between a retracted position and a raised position;

an actuator interposed between said seat and said slip preventing member, and adapted to move said slip preventing member toward said raised position;

a lock mechanism for retaining said slip preventing member at said raised position;

a seat belt pretension device which is adapted to move a seat belt buckle in a direction away from an occupant seated on said seat; and a shaft mounted on said seat, wherein the slip preventing member is pivotably mounted on said shaft, wherein said locking mechanism is mounted on said shaft.

* * * * *